United States Patent [19]

Saito et al.

[11] Patent Number: 4,961,182
[45] Date of Patent: Oct. 2, 1990

[54] INFORMATION RETRIEVING SYSTEM WITH LEVEL CLAMPING

[75] Inventors: Atsushi Saito, Ichikawa; Takeshi Maeda, Kokubunji, both of Japan

[73] Assignee: Hitachi, Ltd., Tokyo, Japan

[21] Appl. No.: 213,135

[22] Filed: Jun. 29, 1988

[30] Foreign Application Priority Data

Jul. 1, 1987 [JP] Japan .................................. 62-162313
Sep. 8, 1987 [JP] Japan .................................. 62-223024
Apr. 28, 1988 [JP] Japan .................................. 63-103905

[51] Int. Cl.$^5$ ............................................... G11B 7/00
[52] U.S. Cl. .................................................... 369/124
[58] Field of Search .................... 369/59, 54, 58, 111, 369/124, 275

[56] References Cited

U.S. PATENT DOCUMENTS

| | | | |
|---|---|---|---|
| 4,545,044 | 10/1985 | Satoh et al. | 369/54 |
| 4,680,647 | 7/1987 | Moriyama | 358/342 |
| 4,727,531 | 2/1988 | Ito et al. | 369/54 |

Primary Examiner—Donald McElheny, Jr.
Attorney, Agent, or Firm—Antonelli, Terry, Stout & Kraus

[57] ABSTRACT

When the data encoded on a recording track is retrieved, the present invention reads the encoded data from the recording track, clamps the read encoded data in predetermined areas of the recording track and interprets the clamped encoded data in accordance with a threshold level.

73 Claims, 14 Drawing Sheets

INFORMATION RETRIEVING SYSTEM WITH LEVEL CLAMPING

BACKGROUND OF THE INVENTION

This invention relates to an information retrieving system and more particularly to a signal retrieving system used for reading an optical recording medium such as an optical disc or an optical tape and suitable for retrieving data stably and accurately irrespective of a signal modulation system and variations of a reflection factor.

A method which utilizes a servo byte area in order to carry out data modulation/demodulation, focussing servo and tracking servo is discussed in SPIE Proceedings, Vol. 695, Optical Mass Data Storage 2 (1986). This article does not particularly mention a data modulation scheme but a data modulation scheme whose mean value does not change easily in accordance with the density of data patterns and which has high direct current free characteristics is recommended at present.

Generally, a data modulation system is evaluated by self-clocking characteristics, a density ratio and data detection window width in addition to the direct current free characteristics. An MFM (Modified FM) scheme used for a magnetic disc, for example, generates "1" on the rear side of a bit cell in response to the data bit "1" and generates "1" on the front side of the bit cell with respect to the second "0" et seq if two or more "0"s continue. Therefore, inversion of "0" and "1" occurs at a suitable frequency in a recording pulse even when "0" or "1" continues in the data bit. Therefore, the direct current free characteristics are high and moreover, a demodulation clock can be generated from the recorded data stream itself. In other words, self-clocking can be accomplished. On the other hand, it is necessary to examine the existence of the recording bit for the ½ detection window width of the data bit width in order to demodulate correctly.

NRZ (Non-Return to Zero) modulation is a scheme which records "1" and "0" of the data bit as the code word, and does not have the direct current free characteristics and the self-clocking ability. However, since the detection window width is the same as the data bit width, this scheme has resistance to jitter fluctuation.

According to a sampled servo format or a format of the same kind, a modulation system can be determined irrespective of the existence of the self-clocking ability of the data itself. As to the direct current free characteristics, however, demodulation in an AC-coupled amplification system is difficult. In the cases where a considerable number of "0"s continue and where a considerable number of "1"s continue, for example, the signal levels whose DC component is cut becomes the same in the AC-coupled amplification system so that if digitization is made at a predetermined threshold value, it becomes impossible to discriminate between "0" and "1". If a system having the direct current free characteristics is used as the modulation system, variations of the reproduced signal level occur due to variations of a reflection factor of the recording medium and retardation.

As described above, in order to obtain correct data from the optical reproduction signal, it is necessary to improve the direct current free characteristics and to suppress the variation of the reproduction signal itself. It is also necessary to suppress the waveform interference arising from the interference of the waveform of the reproduction signal with an adjacent pit and asymmetry of the reproduction signal arising from non-uniformity of pit shapes. In the case of a circular recording pit, for example, asymmetry arising from the pit shape non-uniformity is less and the influence of the waveforms that occur when the adjacent pits come close to one another is rather great. On the other hand, in the case of edge recording for forming an elliptic recording pit by making the leading and trailing edges of the pit correspond to code word "1", the influence of asymmetry arising from the pit shape non-uniformity is great. Since the recording pit is formed by thermal recording, the width of the trailing edge of the recording pit becomes greater than the width of the leading edge. Therefore, the inclination of the reproduction waveform differs between the leading edge and the trailing edge. Therefore, if interpretation of a signal is made at a predetermined threshold value and the signal is converted to a digital signal, the edge position fluctuates.

SUMMARY OF THE INVENTION

The present invention is directed primarily to enabling stable demodulation irrespective of the modulation scheme of recorded data.

Conventionally, the modulation shemes that can be employed have been limited only to those which have high direct current free characteristics and which have the self-clocking ability. However, there exist modulation systems which, though not having such characteristics, have a large detection window width and are stable with regards to jitter. In accordance with the present invention, stable demodulation can be made by use of an AC-coupled amplification system even for those data which are recorded by a modulation scheme not having the direct current free characteristics. It is also possible in accordance with the present invention to enable demodulation which is stable to the variations of the reproduction signal level which depends on the characteristics of the recording medium such as variations of reflection factor and/or retardation.

When the data encoded on a recording track is retrieved, the present invention reads the encoded data from the recording track, clamps the data read from predetermined areas of the recording track and interprets the read data in accordance with a threshold level.

The present invention can be utilized in both where the sampled servo format is used and where it is not used. When the sampled servo format is used, the present invention uses, as a clamp area, a servo area where servo pits are disposed or an exclusive area is disposed specifically, and a reproduction signal level corresponding to this area and to a specific level is clamped by a clamp circuit. When the sampled servo format is not used or in the case of a continuous group format, the present invention discriminates the exclusive area in the data recording area at the time of retrieval, uses this area as the clamp area and clamps the reproduction signal level in this area. The leading and trailing areas of a header portion that is pre-formatted or an area immediately after a resynchronization (RESYNC) mark inserted into the data can be used as the exclusive area in the data recording area.

The clamp circuit is turned ON intermittently for a period corresponding to the clamp area. When the clamp circuit is ON, the signal level is clamped to a pre-set DC potential for that period. It is OFF in the zones other than the clamp area, and the signal level is kept by a time constant that is determined by the capacity of a capacitor connected in series with the signal line and a resistor inserted between the signal line and the ground. Since the clamp area produce a signal of a predetermined level, the DC component can be compensated for the non-clamp area, by clamping the signal level to a predetermined DC potential, and a reproduction signal having less variation can be obtained.

In the case of optomagnetic recording which uses vertical magnetization film, as a recording film and utilizes the sampled servo format to record data by the change of the direction of magnetization by using an optical beam as a temperature raising beam. Magnetization data as a difference signal can be detected by use of a differential optical system and pre-pit data of the servo pits and clock pits can be detected as a sum signal. Therefore, if an area between a certain pre-pit and an adjacent pre-pit is used as the data recording area and the servo area where the pre-pits are disposed is used as the clamp area, the signal level obtained from this clamp area corresponds to the direction of initial magnetization (at the time of non-recording) and exhibits a substantially constant value. If the reproduction signal level at this portion is clamped to a certain DC potential by the clamp circuit, the DC component of the signal recorded in the data recording area can be demodulated correctly. For this reason, even if the AC-coupled amplification system is used, the data recorded by use of a modulation system not having the direct current free characteristics can be demodulated.

Even if a write-once type recording film is used, only the pre-pits such as the clock pit and the servo pits can be detected selectively by front-to-back differential detection by a split type photo detector by disposing the pre-pits as phase pits. In this case, the data pit is recorded as a density pit. In this manner, processing can be made in the same way as in the optomagnetic recording described above.

The clamped reproduction signal is interpreted in accordance with a threshold level. When the data pit is recorded thermally by use of an optical beam such as in an optomagnetic disc or an optical disc, the waveform interference and asymmetry of the reproduction signal must be suppressed. Particularly in the recording system which uses the edge position of the pit as the data, variation of the detected edge positions may occur by digitization using a certain predetermined threshold value if the inclination is different between the rise and fall of the reproduced waveform.

The present invention improves asymmetry of the reproduced waveform and makes it possible to correctly detect the signal which is hardly affected by the data patterns resulting from the difference in modulation systems. The detection is accomplished by carrying out digitization by use of a threshold value which is generated using the reproduction signal level of the pit portion as the reproduction signal level. To this end, the present invention uses an equalization circuit whose gain differs in accordance with a frequency band. This equalization circuit is disposed suitably at the pre-stage before the data signal read by read means is inputted to the level clamp circuit described above. A circuit having characteristics such that it sets the delay time asymmetrically and sharpens only the leading edge side where the inclination of the reproduced waveform is gentle can be used suitably as a waveform equalization circuit for making equal the inclination of the leading edge of the reproduced waveform to that of the trailing edge.

The threshold level is set by detecting and holding the reproduction signal level of the pit portion, whose level variation is relatively small, and using it as the reference. Interpretation (digitization) of the signal is made by a circuit system consisting of a hold circuit for detecting and holding the reproduction signal level of the pit portion, a voltage divider circuit for dividing the signal level and obtaining the threshold value and a comparison circuit for digitizing the reproduction signal. In the case of the optical disc using an ablative type recording film, for example, the variation of the reflection factor of the pit portion formed in the ablative type recording film is extremely small in comparison with the variation of the reflection factor of the unrecording area. The variation of the reflection factor is great in the unrecording area due to fine corrugation and scratches generated during the production of the disc. Therefore, the signal level at this portion fluctuates, as well.

At the pit portion, on the other hand, the variation due to the corrugation and scratches is kept small because the recording film is formed by fusion and evaporation by the heat of laser beam and because the value of the reflection factor itself drops. Therefore, if the reproduction signal level at the pit portion is used as the reference value, a stable threshold level can be set.

A level detection circuit detects the level of the pit portion such as a peak value, for example. Preferably, amplification and transmission of the signal is made by a direct current (DC) amplifier for the circuit portion from a photodetector to the level detection circuit. However, an AC amplifier which does not pass the DC component may be used if no influence is exerted to the transmission of the signal band. The detected level value is held by the hold circuit at least until the signal of the next pit portion is inputted. The threshold value is generated from this level value by the voltage division circuit. The reproduction signal is digitized by this threshold value to detect the edge position. In this case, the voltage division value of the level value held is used as the threshold value. However, it is also possible to employ a method which sets in advance the threshold value as a fixed level and moves the threshold valve up and down by the value corresponding to the variation of the level value that is held. The time constant of the hold circuit is preferably set to a somewhat great value so that it is resistant to defects of the recording medium.

BRIEF DESCRIPTION OF THE DRAWINGS

FIGS. 3 to 5 are diagrams useful for explaining the data modulation system used in the present invention, wherein FIG. 3 shows a signal waveform diagram at each portion when MFM modulation is recorded as position data, FIG. 4 is a signal waveform diagram at each portion when MFM modulation is recorded as edge data and FIG. 5 is a signal waveform diagram at each portion in the case of NRZ modulation;

DESCRIPTION OF THE PREFERRED EMBODIMENTS

Figure 1:
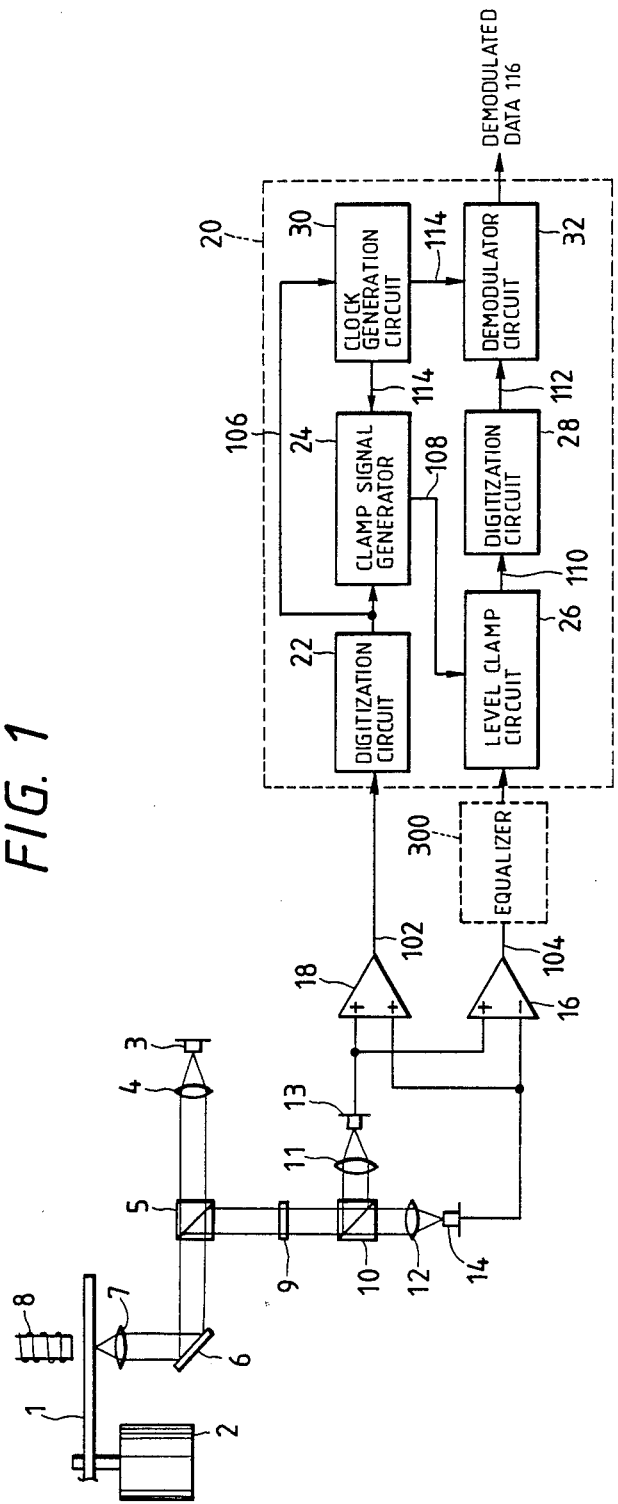
FIG. 1 is a structural view showing an embodiment of an information retrieving system of the present invention.

FIG. 1 shows an optomagnetic disc apparatus as an example of an information retrieving system in accordance with the present invention.

Among the constituents of the optical disc apparatus, FIG. 1 shows only a detection optical system and a detection electrical system but a control system of an optical spot, a recording electrical system, and the like, are omitted. In FIG. 1, a disc 1 is rotated by a spindle motor 2. A laser beam outgoing from a semiconductor laser 3 is converted to parallel beams by a collimate lens 4, then passes through a beam splitter 5, is reflected by a Galvanomirror 6 and condensed on a recording film on the disc 1. The position of an objective lens 7 is moved up and down in accordance with vertical fluctuation of the disc 1 so as to form always a focus on the surface of the recording film. This is referred to as "focussing servo". As to the fluctuation of the disc 1 in the radial direction, the optical spot is always positioned on a target track by controlling the angle of rotation of the Galvanomirror 6 and the position of the optical head as a whole. This is referred to as "tracking servo". It is possible to employ an arrangement wherein a fixed mirror is used as the Galvanomirror 6 and the objective lens 7 can move in vertical and radial directions. The detection system shown in FIG. 1 shows the structure when a vertical magnetization film (optomagnetic medium) is used as the recording film of the optical disc 1.

Next, recording, erasing and retrieval of data will be explained briefly. When the data is recorded, optical intensity of the semiconductor laser 3 is modulated in accordance with recording data and the temperature of the recording film is raised locally. It will be assumed that the direction of magnetization of the vertical magnetization film disposed on the disc 1 is set in advance either upward or downward. When the temperature of the recording film reaches a Curie point by the radiation of the optical beam, magnetization of the recording film is lost due to the thermomagnetic effect. If, at this time, a magnetic field in a direction opposite to that of non-recording is applied by a magnetic head (e.g. electromagnetic head) 8 disposed in such a manner as to face the optical head while interposing the disc 1 therebetween, the portion at which the temperature is raised forms an area (magnetic domain or magnetic pit) where the direction of magnetization becomes opposite locally to that of the surrounding portions. This is recording. The recorded data can be erased by raising DC-wise the optical intensity of the semiconductor laser 3 to the level approximate to that of recording and setting the impressed magnetic field from the electromagnetic coil 8 to the opposite direction to the direction at the time of recording. Though the description of recording and erasing represents the case where the optical intensity is modulated in accordance with the recording data, it is also possible to employ a magnetic modulation system for recording the data by keeping the optical intensity constant and inversing the impressed magnetic field in accordance with the recording data.

The data is retrieved by detecting the angle of rotation of the polarization plane of the reflected beam. After passing again through the objective lens 7, the reflected beam from the disc 1 is reflected by the beam splitter 5 and is led to a half wave plate 9. After the major axis of the polarization plane is rotated by 45° by the half wave plate 9, the P polarization component of the beam transmits through the beam splitter 10 but the S polarization component is reflected. The component beam on the transmission side is condensed to a photodetector 14 by a lens 12. The component beam on the reflection side is condensed on a photodetector 13 by a lens 11. The ratio of the P and S polarization components changes in accordance with the change of the direction of magnetization of the recording film. Therefore, the change of the direction of magnetization can be detected by calculating the difference of the signals detected by the photodetectors 13 and 14, respectively.

An amplifier 16 is a differential amplifier, and the output of this amplifier 16 becomes a magnetization signal (data signal). On the other hand, the reflected beam from the phase pit or density pit on the disc 1 does not involve the rotation of the polarization plane so that the change of quantity of incident beam into the photodetectors 13 and 14 is the same, in principle. Therefore, the signal based on the phase pit does not appear on the data signal 104. The pit signal 102 based on the phase pit can be detected by calculating the sum of the signals detected by the photodetectors 13 and 14 by the amplifier 18. Since the P polarization component and the S polarization component appear as the intensity of mutually opposite phases at this time, the change of the direction of magnetization does not appear as a signal on the pit signal 102. In this manner, the signal involving the change of the reflected beam quantity due to the phase pit or the like on the disc 1 appears only on the pit signal 102 and the signal involving the change of rotation of the polarization plane appears only on the data signal 104. The pit signal 102 becomes a pit pulse 106 digitized by a digitization circuit 22.

A level clamp circuit 26 is one that clamps the level of the magnetization signal at a pit position on the disc 1 or in a clamp-only area to a certain predetermined value, and is controlled by a clamp signal from a clamp signal generator 24. The correction data signal 110 thus clamped is converted to a data pulse 112 by the digitization circuit 28, and original demodulated data 116 is reproduced by a demodulator 32 by use of the clock 114 that is generated by a clock generation circuit 30. The detailed structure and operation of each principal constituent of the reproduction circuit 20 will be described elsewhere. Reference numeral 300 represents an equalizer and this will be described later, too.

Figure 2:
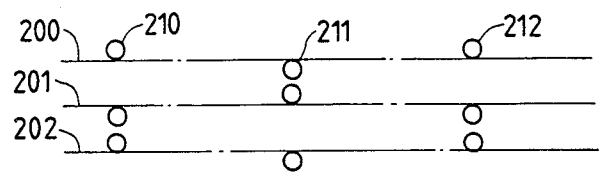
FIG. 2 shows an example of a disc format used in the present invention.

Next, an example of the disc format for practising the present invention will be described. FIG. 2 is an enlarged view of a certain portion on the disc 1. One-dot-chain line represents each track for recording data, which is virtually and along which the data is recorded and retrieved. It is disposed on the disc 1 either concentrically or spirally. Pre-pits 210-212 for tracking and clocking are disposed alternately on the right and left of each track 200-202. These pre-pits 210-212 are disposed in advance in a phase structure. The tracking operation using these pre-pits will be explained briefly. In the disc format such as shown in FIG. 2, the pits 210-212 are disposed in a predetermined interval or with certain regularity. Where location is made in such a manner that the optical spot scans accurately the tracks 200-202, the signal amplitude obtained from the pit signal from the pit 210 is equal to that of the pit signal obtained from the pit 211. However, if the position of the optical spot is deviated either to the right or to the left from the normal track center, the signal amplitude from the pit positioned on the deviation side becomes greater and the signal amplitude from the opposite side becomes smaller, on the contrary. Therefore, the signal amplitudes of the pits 210 and 211 positioned on the right and left sides of this track get unbalanced. The optical spot can be located in such a manner as to scan always the target track by controlling the position of the optical spot so as to correct this unbalance.

Since the format shown in FIG. 2 is a mere example, the present invention can be practised by use of a sampled servo format that is known generally. The sampled servo format is discussed, for example, in SPIE Proceedings, Vol. 695, pp. 239-242, 1986, Optical Mass Data Storage 2.

Figure 3:
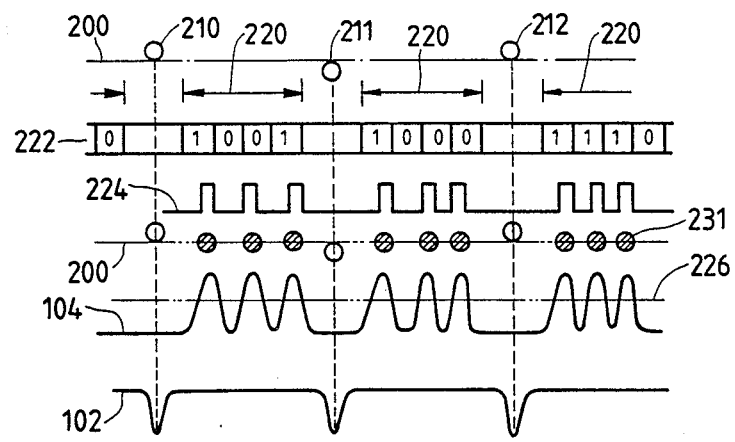
Figure 4:
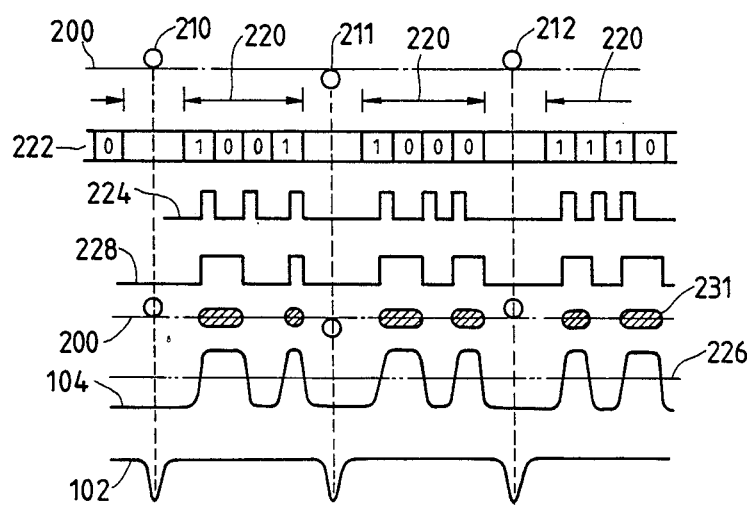
Figure 5:
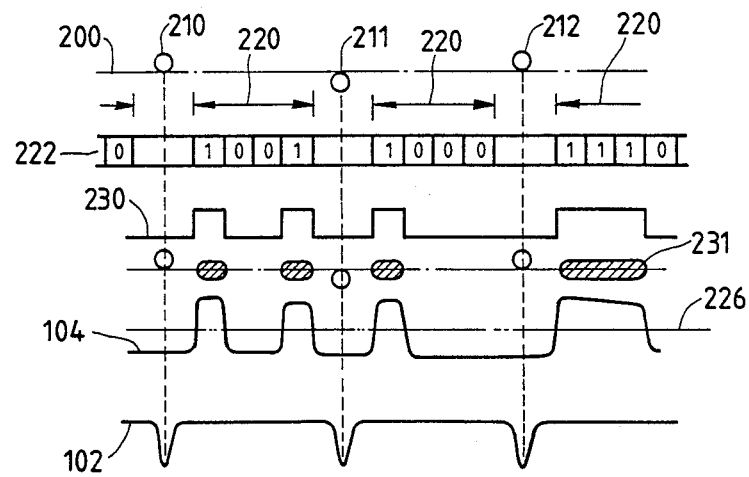

FIG. 3 shows the signals when data recording and retrieval is made by use of the format such as shown in FIG. 2. FIGS. 3 and 4 show the cases where modified FM (MFM) is used as the modulation system of the recording data and FIG. 5 shows the case where NRZ is used, by way of example. In FIG. 3, the explanation will be given about the case where the recording data 222 is recorded in the data recording area 220 between the pre-pits. MFM outputs the pulse corresponding to the ½ bit to the trailing side of the bit cell for the data bit "1" and outputs the pulse corresponding to the ½ bit to the leading side of the bit cell of the second "0" et seq, if two or more "0s" continue, for the data bit "0". In this manner, inversion of "1", "0" occurs always as the recording pulse in MFM even when "1" or "0" continues in the data bit. Therefore, MFM is characterized in that the mean level of the modulated recording pulses and reproduction signal train is kept substantially constant for an arbitrary data bit train. A modulation system having such characteristics is referred to as a modulation system having a "DC free characteristics". FIG. 3 shows the case where the code "1" of the MFM-modulated code word is made to correspond directly to the recording pulse 224 and i recorded in the data recording area 220 on the track 200. The recording domain 231 represented by oblique line is an area having an opposite magnetization to the surrounding portion, and when the optical spot scans the track 200, the reproduction signal can be obtained as the data signal 104. FIG. 4 shows the case where the edge of the recording pulse 228 is made to correspond to "1" of the code word which is MFM-modulated. FIG. 5 shows the case where the recording data 222 is recorded by NRZ modulation. In FIGS. 3 to 5, the recording pulse is returned to the "0" level in the area where the pre-pits 210-212 exist, so as to keep the direction of magnetization near the pre-pit under an unrecorded state and to clamp the level of the magnetization signal (data signal) at the portion where the pre-pits 210-212 exist by a later-appearing level clamp circuit. The pit signal 102 can be obtained as a signal corresponding to the pre-pit 210-212. In FIGS. 3 and 4, the fluctuation of the reproduction signal with respect to the mean level 226 is relatively small because the modulation system having the good DC free characteristics is employed. Therefore, data recognition can be made relatively stable at a predetermined threshold value even when a system wherein an electrical system for detecting the data signal 104 is of an AC-coupling type and only the change component of the signal is transmitted.

The degree of modulation of an optomagnetic signal is generally lower than a D.C. level. Therefore, when the signal is amplified by D.C. coupling, the problem is likely to occur in that the output gets into saturation by the D.C. level component. It is therefore desired to extract only the change component by A.C. coupling and to amplify the same. In MFM shown in FIGS. 3 and 4, the detection window width is ½ of the data bit. In other words, in order to demodulate correctly the data, the peak position of the reproduction data signal 104 and the existence of the edge position must be discriminated with respect to the time width of ½ of the data bit. This means that a modulation system having a greater detection window width is more advantageous for the peak shift or edge shift. In NRZ modulation recording shown in FIG. 5, the mean level changes due to the duty ratio of the reproduction data signal 104. The drawing shows the mode of change of the level of the reproduction signal while the mean level 226 is kept constant. The time of the detection window width in NRZ modulation is equal to the data bit width and corresponds to twice that of MFM. Where "0" or "1" continues due to the lack of the DC free characteristics, however, the signal level becomes the same level in AC coupling. Therefore, the advantage of NRZ modulation can be exploited even in the case where amplification by AC coupling is desired, if the clock signal for recording and retrieval can be generated by any means and moreover, the D.C. component can be reproduced, too.

The format shown in FIG. 2 can detect the tracking signal by the pre-pits 210–212 and can also generate the clock signal for modulation and demodulation by the clock generation circuit 30. Therefore, even when the modulation system itself does not have the self-clocking ability, recording and retrieval can be made. Where the D.C. component is used as the band as in the case of NRZ modulation, the DC component will be lost if amplification by mere AC-coupling and modulation cannot be made any more. Accordingly, the DC component is restored by clamping the reproduction data signal level in the areas corresponding to the pre-pits 210–212 or in the unrecording area disposed exclusively for this purpose, to a certain potential by the level clamp circuit 26. The definite method of this operation will be described elsewhere.

In the examples shown in FIGS. 3 to 5, the data signal 104 and the pit signal 102 can be separated and detected at the stage of the detection system. However, in the case of an optical disc of the type wherein the data is recorded by the phase pit or density pit, the pre-pit and the data bit must be separated by other means. A typical optical method sets the depth of the pre-pit near to $\frac{1}{4}$ of the retrieving laser beam wavelength, uses it as the phase pit and uses the density pit as the data pit. To detect only the phase pit selectively, there is a method which disposes a split type photodetector in the far field of the reflected beam from the disc and detects by their difference signal. Only the density pit can be detected by obtaining the sum signal of the split type photodetector. As an electrical method, there is a method which makes selective detection by pattern collation by use of individual patterns which do not occur in the data pit train, as the patterns of the pre-pit train. This method is already known as a detection system of the servo pit area in the sampled servo format.

Figure 6:
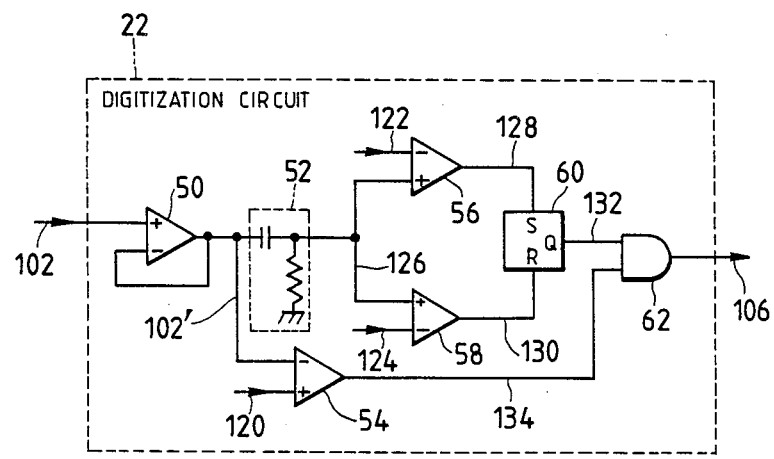
FIG. 6 shows a structural example of a digitization circuit used in the present invention.
Figure 7:
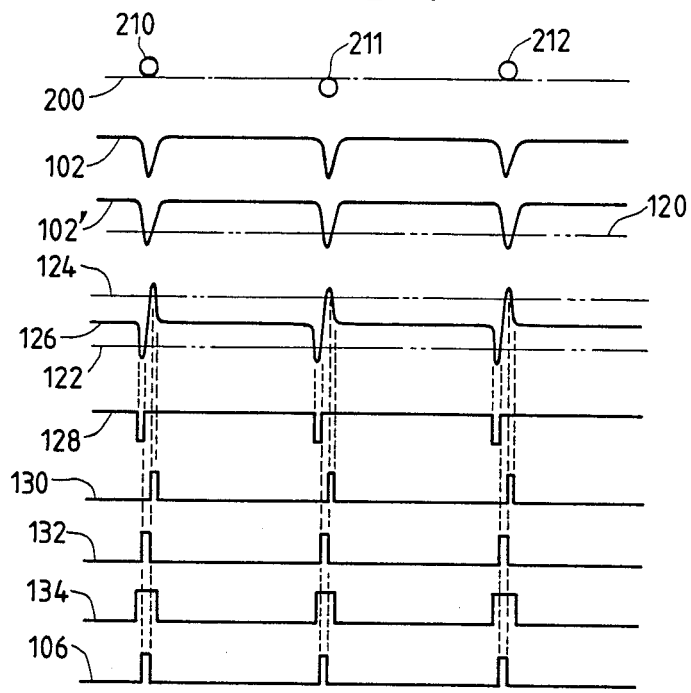
FIG. 7 is a waveform diagram showing the operation of the digitization circuit.

Next, the principal portions of the constituent elements in FIG. 1 will be explained. FIG. 6 shows one structural example of the digitization circuit 22 and FIG. 7 is a waveform diagram useful for explaining the operation of the circuit. The digitization circuit 22 shown in FIG. 6 is a circuit which detects the pit center position from the pit signal 102 and generates the pit pulse 106. The pit signal 102 is converted to a low impedance by a buffer 50 and is inputted to a differential circuit 52 and to a comparator 54. A reference level 120 is applied to the other input of the comparator 54 and when the pit signal 102 exceeds this reference level 120, a gate pulse 134 becomes "High" ("H"). The differential circuit 52 converts the signal 102′ to a differential signal 126, which is then inputted to comparators 56 and 58. When the differential signal 126 is at a higher level than the reference level 122, the comparator 56 outputs "High" as a set pulse 128. On the other hand, the comparator 58 outputs "High" as the reset pulse 130 when the differential signal 126 is at a higher level than the reference level 124.

When the rise of the pulse is inputted to the set (S) terminal, the output (Q) of the flip-flop 60 becomes "High" and when the rise of the pulse is inputted to the reset (R) terminal, the output (Q) becomes "Low". Therefore, a peak detection pulse 132 is generated by the resulting set pulse 128 and reset pulse 130. Though this peak detection pulse 132 may be as such used as the pit pulse 106, it is possible to prevent the output of the pit detection pulse at the portion where the pits 210–212 do not exist, due to the influences of signal noise, by calculating the logical product by the gate pulse 134 and an AND gate 62.

Figure 8A:
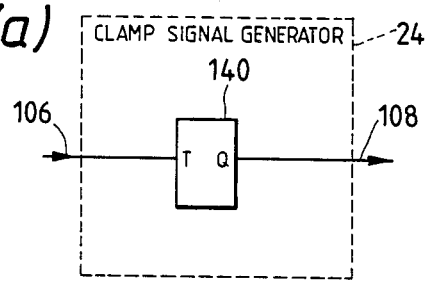
FIG. 8(a) and 8(b) show a structural example of a clamp signal generator.
Figure 8B:
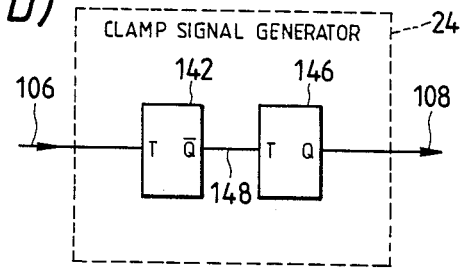
Figure 9A:
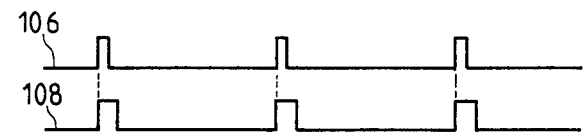
FIGS. 9(a) and 9(b) are waveform diagrams showing the operation of the clamp signal generator.
Figure 9B:
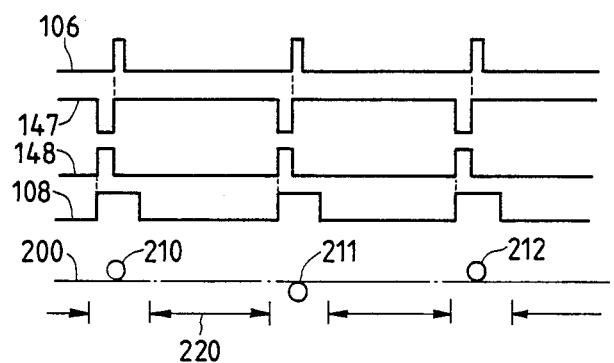

FIGS. 8(a) and 8(b) show the structural examples for generating the clamp pulse 108 from the pit pulse 106, respectively. FIG. 8(a) shows a circuit which inputs the pit pulse 106 to the trigger (T) terminal of a mono-multi vibrator 140 and generates the clamp pulse 108 which becomes "High" for an arbitrary time from the rise edge of the pit pulse 106. In this case, the clamp pulse 108 is always generated after the pit center position time-wise and near the pit. FIG. 8(b) shows an example of a circuit which can generate the clamp pulse 108 at an arbitrary position. In other words, this circuit uses mono-multi vibrators 142 and 146, the first mono-multi vibrator 142 generates an output which becomes "High" for an arbitrary time from the rise edge of the pit pulse 106, and the final clamp pulse 108 is generated by the second mono-multi vibrator 146 by triggering the fall of this output. In FIG. 8(b), an inversion signal ($\overline{Q}$) 148 is used as the output of the mono-multi vibrator 142 and this is used as the trigger input (T) of the second mono-multi vibrator 146. By so doing, the clamp pulse 108 can be generated at an arbitrary position on the track 200. FIG. 9(b) shows the case where the clamp pulse 108 is generated in an area other than the data recording area 220 with the position of the pits 210–212 being the center.

According to the circuit shown in FIG. 8(b), even if an unrecording area is disposed as the clamp-only area at the position other than the pits 210–212, for example (e.g. see later-appearing FIG. 12), the clamp pulse can be generated easily in that clamp-only area.

Figure 10:
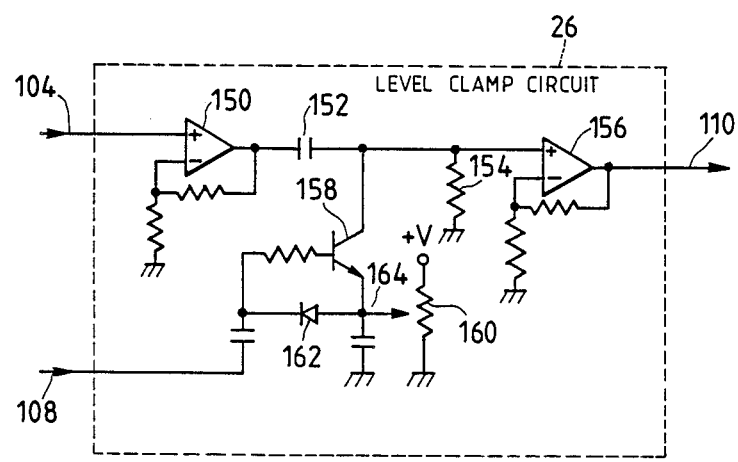
FIG. 10 is a structural view showing a level clamp circuit used in the present invention.
Figure 11:
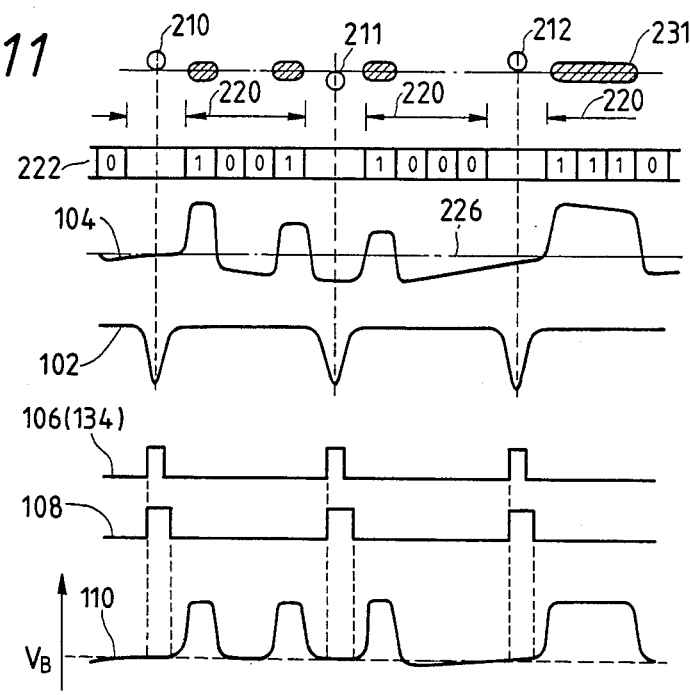
FIG. 11 is a waveform diagram showing the operation of the level clamp circuit.

FIG. 10 shows a structural example of the level clamp circuit 26 and FIG. 11 shows its operation. The data signal 104 is inputted to an amplifier 150 and amplified to a suitable level. Thereafter, it is inputted to a CR circuit consisting of a capacitor 152 and a resistor 154 and the signal processed in this circuit is again amplified by an amplifier 156 to a suitable level and becomes a correction data 110. On the other hand, the portion consisting principally of the transistor 158 is a switching circuit and only when the transistor 158 is ON, the signal level is clamped to substantially the nearly same level as an emitter potential (clamp level) 164. When the clamp pulse 108 is "High", the base potential of the transistor 158 rises and becomes ON. itself. A diode 162 is disposed in order to prevent discharge acceleration and to intercept the reverse current when the transistor 158 is turned OFF. A variable resistor 160 is disposed for setting the clamp level. The operation of this level clamp circuit 26 will be described with reference to FIG. 11.

The data signal (magnetization signal) is inputted to the amplifier 150 but when AC-coupled, the mean level fluctuates due to the density of the signal, that is, the duty ratio, as shown in the drawing. Since the pre-pits 210–212 exist in a regular interval, the fluctuation of the mean level is small if the time constant of AC-coupling is great even when the pit signal 106 is amplified by AC-coupling. Digitized pit signal 106 (or 134) can be obtained by digitizing the pit signal 102 at a suitable slice level by the digitization circuit 22. The clamp signal generator 24 generates the clamp pulse 108. The signal level of the data signal (magnetization signal) is clamped to the potential $V_B$ which is set by the variable resistor 160 only in the zone where the clamp pulse 108 is "High". In the zone where the clamp pulse 108 is "Low", a signal 110 using the clamp level as the reference is obtained in accordance with the time constant determined by the capacitor 152 and the resistor 154. If this circuit is used, the DC component is recovered equivalently even in the AC-coupled signal processing system. Therefore, accurate digitization becomes possible even in a modulation scheme not having the DC free characteristics such as NRZ modulation.

Now, let's consider the time constant determined by the capacitor 152 and the resistor 154 in the level clamp circuit 26 shown in FIG. 10. If the switching circuit by the transistor 158 does not exist, the circuit becomes the CR circuit which is used widely as the AC-coupled circuit. If the time constant RC of the CR circuit is made sufficiently greater than the inverse value of the lowest frequency of the data signal, the waveform can be transmitted with fidelity but since the DC component is lost, the DC component is inserted by the switching circuit to clamp the level. It will be assumed hereby that the time in which the clamp pulse 108 becomes "High", that is, the switch is ON, is $T_1$ and the time in which the clamp pulse 108 is "Low", that is, the switch is OFF, is $T_2$. It will be assumed also that the ON resistance of the transistor 158 is r and its OFF resistance is infinity. If the capacity of the capacitor is C and the value of the resistor 154 is R, distortion of the waveform can be reduced to a low level by making the time constant rC at the turn-on of the switch greater than $T_1$ and making also the time constant RC at the time of turn-off of the switch greater than $T_2$. Assuming that the charge charged and discharged to and from the coupling capacitance C throughout one period of $T_1$, $T_2$ is equal, the deviation $\Delta V$ of the clamp level is given by the following formula:

$$\Delta V \simeq T_2 rV/T_1 R$$

Here, V is the amplitude value when the amplitude of the data signal is constant. For instance, if $T_1$ and $T_2$ are 1 μs and 10 μs respectively, the ON resistance of the transistor 158 is 100 Ω and the clamp potential is 0 V, the deviation of the clamp level is 1% by selecting the capacity of the capacitor 152 to 0.1 μF and the value of the resistor 154 to 100 KΩ and a signal having an amplitude of 1 V is inputted. The deviation of such a degree renders no practical problem.

The effect of the clamp circuit 26 is suppression of the fluctuation of the signal amplitude and that of the signal as a whole due to the change of the reflection factor and to the retardation of the disc substrate. Particularly in the case of the optomagnetic disc, the retrieving signal fluctuates greatly due to the polarization characteristics (retardation, etc.) of the disc because even a limited revolution of the polarization plane must be detected, besides the fluctuation of the reflection factor of the disc. When the frequency component of this fluctuation is examined, it is found that the frequency component exists almost in the zone of below 1 kHz if the number of revolution of the disc is about 30 Hz. Therefore, if the component below 1 kHz is attenuated by AC-coupling, the influence of the fluctuation described above can be limited to a low level. However, since the DC component cannot be reproduced by mere CR coupling, it is not possible to handle a modulation scheme which has a zone which contains the DC component not having the DC free characteristics. The present invention solves this problems by clamp processing.

Though FIG. 10 shows the example which uses the transistor 158 for the switching circuit, the similar operation can be made by use of a field effect transistor (FET) and an analog switch, a diode switch, or the like. Where the time constant must be changed by the characteristics of the disc or its inner or outer periphery, variable type capacitor and resistor may be used as the capacitor 152 and the resistor 154 or a plurality each of the capacitors and resistors are prepared beforehand so as to select them suitably in accordance with the disc characteristics or with the position of the inner or outer periphery.

Figure 12:
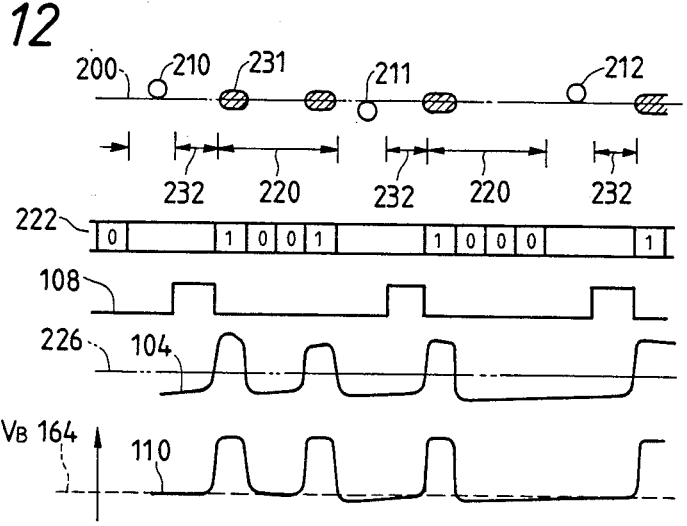
FIG. 12 is an explanatory view of the operation of the clamp circuit when a disc format equipped with a clamp-only area is used.

FIG. 12 shows the application to another track format. In the track format shown in FIG. 12, a clamp-only area 232 is disposed separately from the area where the pre-pits 210-212 are disposed. The foregoing description describes that when the magnetization signal is obtained by differential detection, the reflected beams from the pre-pits are offset. In practice, however, disturbance somewhat occurs in the data signal (magnetization signal) 104 obtained from the area where the pre-pits are disposed, due to the unbalance of the optical or electrical system or because the direction of magnetization of the slope around the pre-pits is not always perpendicular. Therefore, in order to clamp the data signal at an accurate level, it is preferred to dispose the clamp-only area 232 such as shown in FIG. 12. This clamp-only area is an unrecording area where the data is not recorded. FIG. 12 shows the case where the recording data 222 is recorded in the data recording area 220 by NRZ modulation. The clamp pulse 108 is generated in the clamp-only area 108 by the clamp signal generator 24 shown in FIG. 8(b). Due to the density of the duty ratio, the mean value of the data signal 104 before clamp processing fluctuates but after clamp processing, the corrected data signal 110 can be made a signal having a small fluctuation of the mean value with the clamp level 164 being the reference. The method which disposes the clamp-only area 232 as the track format and clamps the level of the retrieving signal obtained from this area is effective also in the case where the recording pit 231 is recorded as the density pit.

Figure 13:
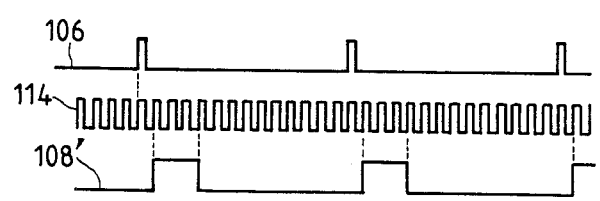
FIG. 13 is a diagram showing the operation of a clock generator used in the present invention.

FIG. 13 shows the operation of the clock generation circuit 30. The pit pulse 106 is inputted to the clock generation circuit 30 and reproduced clock 114 is generated by an internal phase-locked loop (PLL). The phase of the pit pulse 106 is made to conform with the phase of the rise edge of the reproduced clock 114 by the PLL circuit. A PLL circuit of the type that has been used conventionally in the reproduction circuit of magnetic discs or the like can be used as this PLL circuit and the detailed description of the circuit is hereby omitted.

Figure 14:
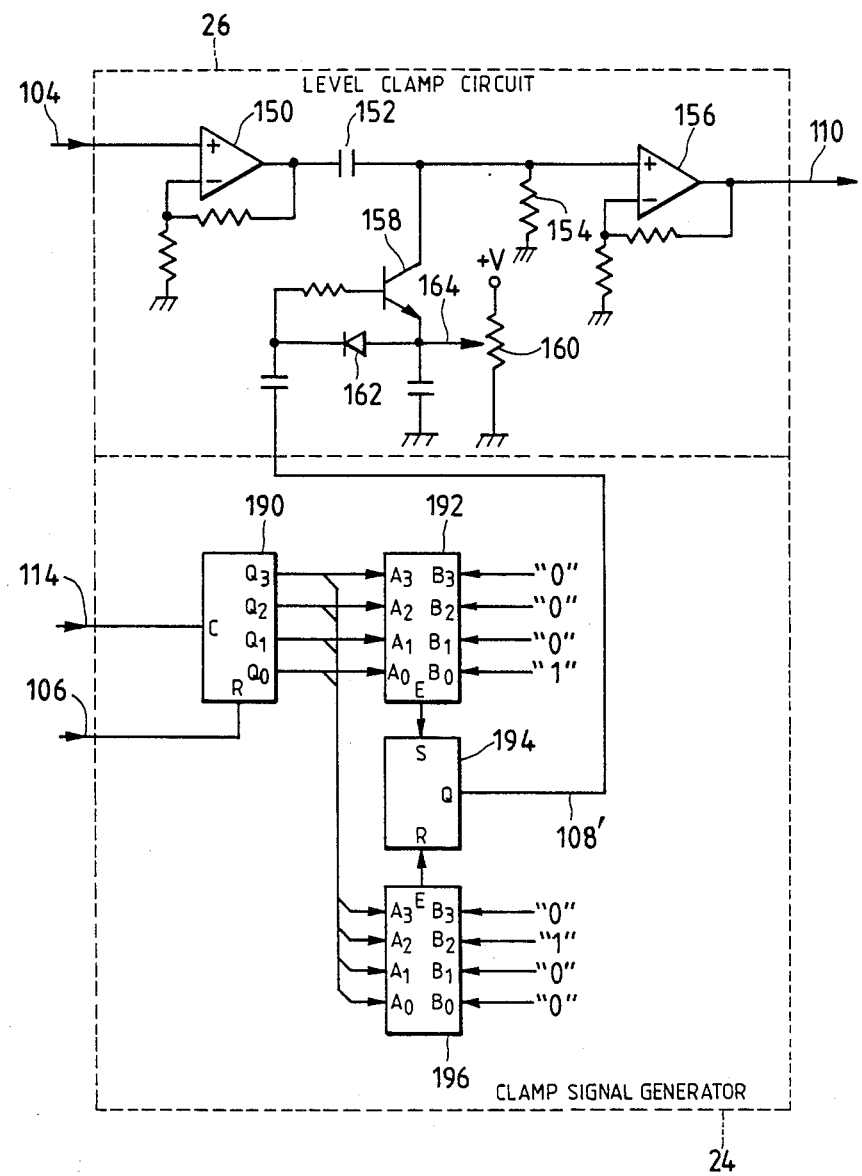
FIG. 14 is a diagram showing a structural example of a clamp signal generator when the clamp pulse is generated by the reproduction clock.
Figure 15A:
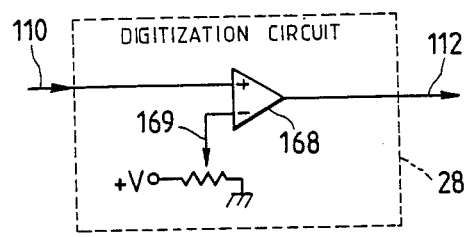
FIGS. 15(a) to 17(b) are block diagrams showing the structural examples of digitization circuits for digitizing the level-clamped reproduction signal, respectively, used in the present invention, together with the operation waveforms thereof.
Figure 15B:
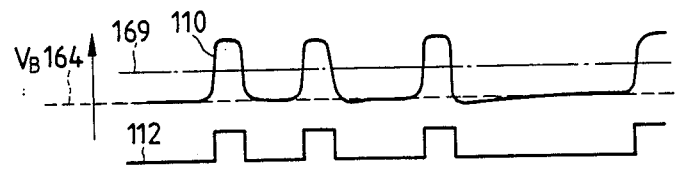

In the clamp signal generator 24 shown in FIGS. 8(a) and 8(b), the clamp pulse 108 is generated by using directly the pit signal 106. The clamp pulse 108 can be generated, too, by counting the reproduced clock 114 obtained by the clock generation circuit 30. The circuit shown in FIG. 14 represents a structural example of a level clamp circuit 26 to which clamp signal generation circuit 24 for generating the clamp pulse 108' from the counted values "1" to "4" by counting the reproduced clocks as shown in FIG. 13 is added. The reproduced clocks 114 are inputted to the clock (c) terminal of an N-notation counter 190. The pit pulse 106 is inputted to the reset (R) terminal of this counter 190 and when this pit pulse 106 is inputted, the counter is reset to "0". Comparators 192 and 196 are disposed to judge the start and end of the clamp pulse 108', respectively When the output $Q_0$-$Q_3$ of the counter 190 is "1", the coincidence judgement (E) terminal of the comparator 192 becomes "High" and when the output $Q_0-Q_3$ of the counter 190 is "4", the coincidence judgement (E) terminal of the comparator 196 becomes "High". Therefore, a pulse such as shown in FIG. 13 can be generated as the clamp pulse 108' by inputting the output from the coincidence judgement (E) terminal of the comparator 192 to the set (S) terminal of a flip-flop 194 and inputting the output from the coincidence judgement (E) terminal of the comparator 196 to the reset (R) terminal of the flip-flop 194. The unrecording level of the data signal 104 can be clamped to the clamp level 164 set by the variable resistor 160 by controlling the switching circuit inside the level clamp circuit 26 by means of this clamp pulse 108'.

FIGS. 15(a) to 17(a) show structural examples of the digitization circuit 28 for digitizing the clamped data signal 110, respectively. The digitization circuit 28 shown in FIG. 15(a) digitizes the correction data signal 110 by the slice level 169 set by the variable resistor and obtains the data pulse 112.

Figure 16A:
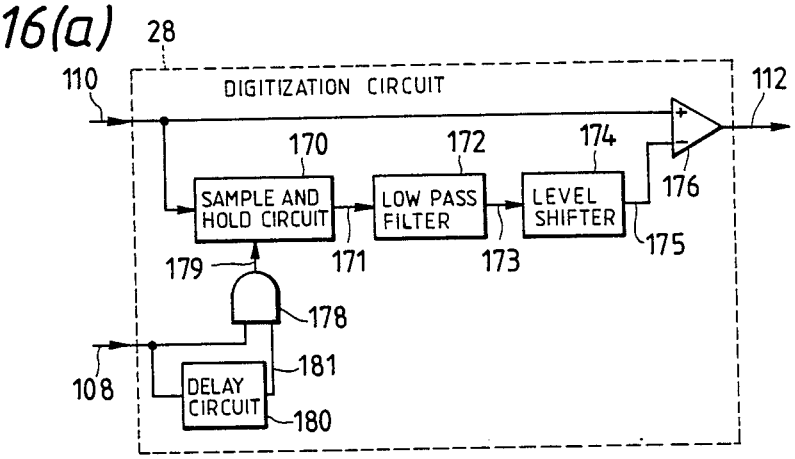
Figure 16B:
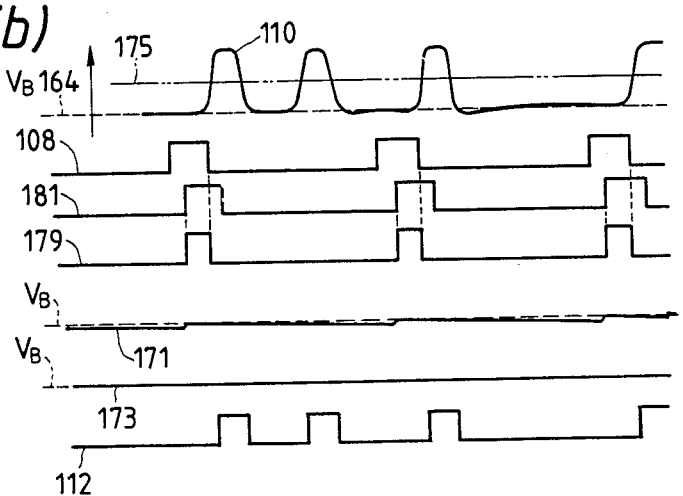
Figure 17A:
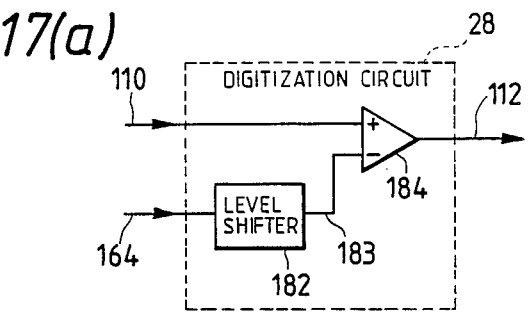
Figure 17B:
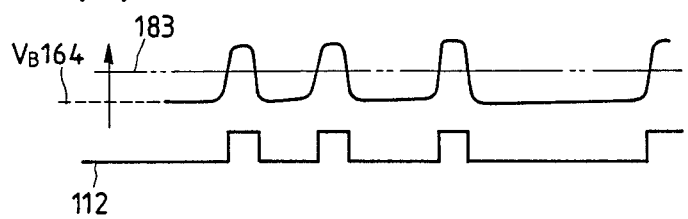

The digitization circuit 28 shown in FIG. 16(a) uses the level of the portion corresponding to the clamp-only area 232 of the correction data signal 110 as the reference of the threshold and obtains the data pulse 112. The clamp pulse 108 is converted to a delay pulse 181 by a delay line 180. An AND circuit 178 calculates the logical product of this delay pulse 181 and the original clamp pulse 108 and generates the sample pulse 179 at the latter half part of the clamp-only area 232. In the former half of the clamp area, the clamp level might not yet be stable due to the time constant of the level clamp circuit 26. Therefore, the latter half of the clamp area where a sufficiently stabilized level can be obtained is preferably used as the reference of the threshold. The sample/hold circuit 170 samples the level of the correction data signal 110 in the zone where the sample pulse 179 is "High" and keeps the sample level in the "Low" zone. The sampled level 171 thus held may somewhat fluctuate due to the characteristics at the time of holding process. Therefore, a low-pass filter 172 is used to absorb the fluctuation component. The level of the output 173 of this filter 172 is converted to a desired slice level 175 by a level shifter 174. Where the slice level 175 may be lower than the output 173 of the low-pass filter 172, a resistor voltage division circuit may be used. If it must be greater than the output 173, a DC amplifier may be used. The data pulse 112 can be obtained by digitizing the correction data signal 110 by a comparator 184 using this slice level 175. FIG. 17(a) shows the case where the digitization circuit 28 uses the clamp level 164 in the level clamp circuit 26 as the reference of the threshold. Namely, the data pulse 112 is obtained by generating the slice level 183 from the clamp level signal 164 by the level shifter 182 and digitizing it by the comparator 184.

In U.S. Patent Application Ser. No. 162,660 entitled "Information Retrieval System with Tracking Error Compensation" dated Mar. 1, 1988, the inventor of the present application proposed a digitization circuit which samples and detects the reproduction signal level at the pre-pits 210-212 from the pit signal 102 and digitizes the data signal 104 by shifting the level of the reproduction signal thus sampled and detected. Such a digitization circuit can be used as the digitization circuit 28 in the present invention.

When the data is recorded by thermal recording by use of the optical beam, waveform interference and asymmetry of the reproduction signal occur so that accurate signal detection cannot be made from time to time. Particularly when the recording pit or the edge position of the recording domain is used as the data, this influence is great. To eliminate the waveform interference and asymmetry of the reproduction data signal, this embodiment uses a waveform equalization circuit (equalizer) providing different gains in accordance with the difference of frequency bands. This equalizer is suitably disposed at the stage before the data signal 104 read by the read means is inputted to the level clamp circuit 26 as shown in FIG. 1.

Figure 18:
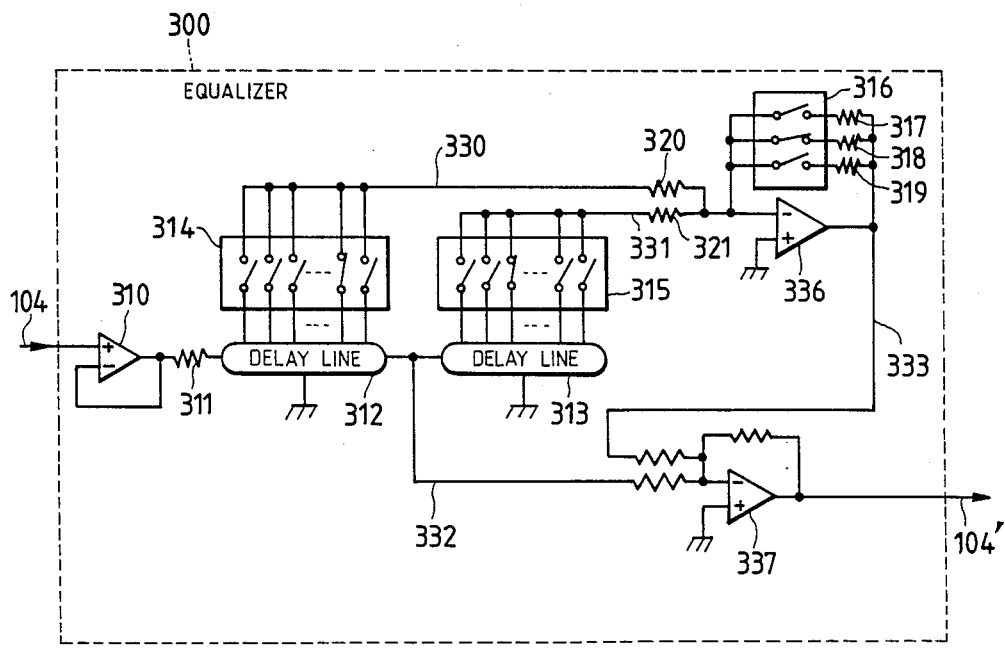
FIG. 18 is a circuit diagram showing a structural example of a waveform equalizer used in the present invention.

FIG. 18 shows a structural example of the equalizer 300. After the output impedance of the reproduction signal 104 is lowered by a voltage follower 310, the signal is inputted to a delay line 312 through a resistor 311 for impedance matching between delay lines 312 and 313. A selector 314 selects and switches the delay time and has a function of changing the equalization characteristics around the inner and outer peripheries of the disc. Similarly, the output terminal of the delay line 313 is connected to a selector 315, too. The respective delay signals 330 and 331 that are selected are added by an adder 336 through resistors 320 and 321, respectively. The gain of addition can be changed by selecting feedback resistance 317~319 by a selector 316. On the other hand, the delay signal 332 is added to an addition signal 333 by an adder 337, providing an equalization output 104'.

Figure 19A:
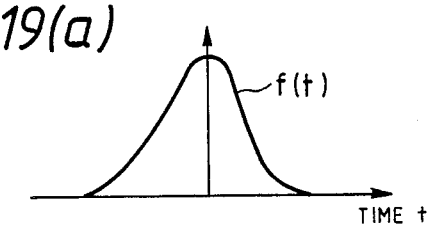
FIGS. 19(a) to 19(d) are waveform diagrams useful for explaining the operation of the waveform equalizer.
Figure 19B:
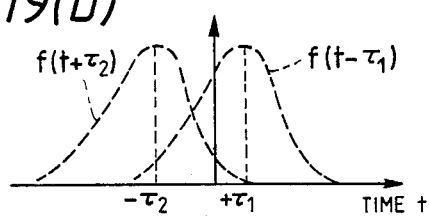
Figure 19C:
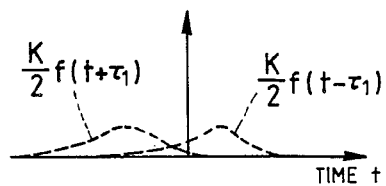
Figure 19D:
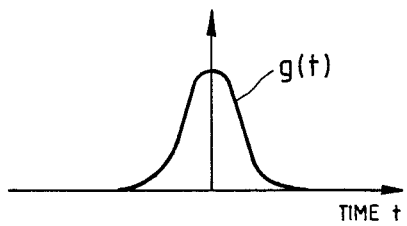

Next, the outline of the waveform processing of the equalizer 300 shown in FIG. 18 will be explained. FIGS. 19(a) to 19(d) show the mode of waveform equalization, wherein the time is plotted on the abscissa and the signal amplitude, on the ordinate. FIG. 19(a) shows the reproduction data signal f(t) obtained from the recording pit, which corresponds to the delay line 332. When the recording pit, particularly an elliptic pit, is formed, the rear part of the recording pit is excessively heated by the influence of thermal diffusion so that the width at the rear part is often greater than that of the front part of the pit. This is so-called a "tear drop shape pit". Though the degree of asymmetry of the recording pit somewhat differs depending on the recording condition, the difference often occurs in the reproduction signal even if asymmetry hardly exists. In the reproduction waveform shown in FIG. 19(a), the left side corresponds to the front part of the recording pit having a small width and the right side does to the rear part having a large width. Among the outputs of the delay line 312, the output which is delayed by $\tau_1$ from f(t) becomes $f(t-\tau_1)$ in FIG. 19(b) and the output which is ahead of f(t) by $\tau_2$ becomes $f(t+\tau_2)$. In the equalizer shown in FIG. 18, the delay signal 330 is $f(t-\tau_1)$ and the delay signal 331 is $f(t+\tau_2)$. FIG. 19(c) shows the waveform formed by multiplying each delay signal by K/2 assuming that the gain of the adder 336 is K/2. In practice, after the delay signals 330 and 331 is added by the adder 336, amplification (attenuation in this case) is made at a selected gain. The waveforms shown in FIG. 19(c) after addition and inversion correspond to the addition signal 333. FIG. 19(d) shows the signal g(t) obtained by adding this addition signal 333 to the original signal f(t), that is, the delay signal 332. This signal g(t) corresponds to the equalization signal 104.

In the structure shown in FIG. 18, asymmetry of the reproduction data signal 104 is compensated for and a waveform having high symmetry is obtained by selecting the delay time and the gain after addition. It is possible to employ an arrangement as another method wherein the input resistances 320, 321 of the adder 336 can be selected to mutually different values and after gain (attenuation) is made different but not be made the same, addition is made to carry out waveform equalization.

When the cylindrical recording pit 231 is formed as the recording data as shown in FIG. 3, the equalizer 300 may or may not be used, but when the elliptic pit 231 is formed in response to the recording data as shown in FIGS. 4 and 5, the equalizer 300 is preferably used. Particularly when the data is retained at the edge position of the recording pit 231 as shown in FIG. 4, it is suitable to improve asymmetry of the reproduction data signal by use of the equalizer 300.

As described above, in the case of the optomagnetic recording, the data signal 104 as the magnetization data and the pit signal 102 obtained from the pre-pits of the phase structure can be separated and detected by the detection system, but in the case of the write-once type (ablative) recording which records the recording data by the density pits, the pre-pits 210–212 and the data pit 231 must be separated and detected by other methods.

Figure 20:
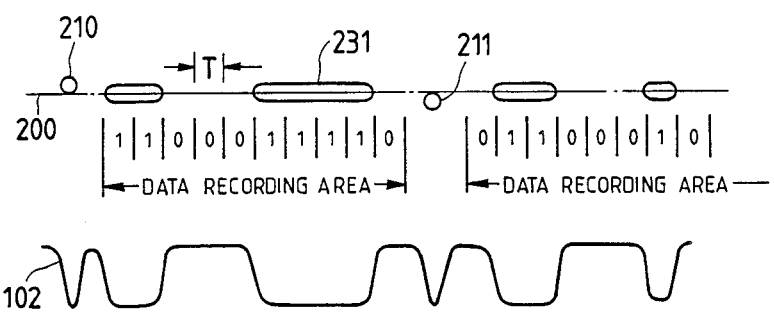
FIG. 20 shows an example of signal waveforms when pre-pits such as a clock pit and data bit exist in mixture.
Figure 21:
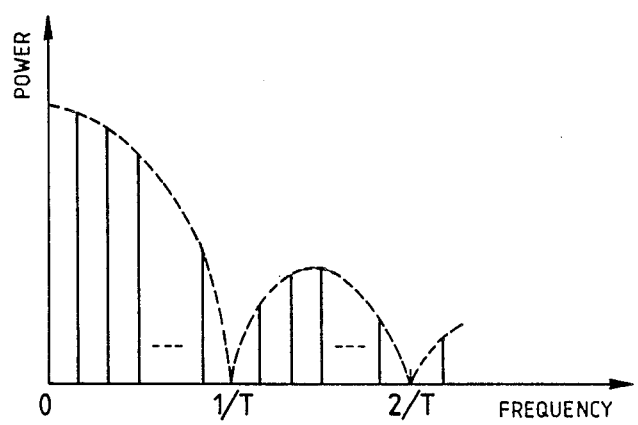
FIG. 21 is a diagram showing the frequency spectra of these mix signals.
Figure 22:
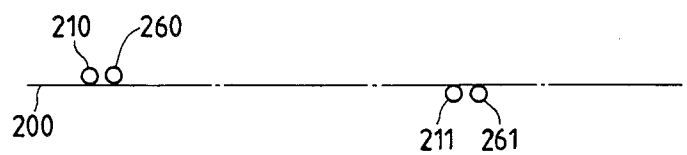
FIG. 22 shows an example of a pre-pit discrimination pattern.

As means for separating and detecting the data pit and the pre-pit, there is a method which detects the pre-pit component on the frequency spectrum and operates a PLL circuit for clocking, besides the aforementioned front-to-back differential system. If ten bit cells exist in the data recording area between pre-pits 210 and 211 for clock and tracking as shown in FIG. 20, for example, the pulse time of the pit signal 102 appears discretely every T time from 0 to 10T when one bit time of each bit cell is T and NRZ recording is made. However, it is necessary to make the gap between the pre-pits 210 and 211 some multiples of the bit time T. If the frequency spectrum is obtained for the pattern shown in FIG. 20, a distribution having extreme values at the frequency 1/T corresponding to the pulse width of the most dense data pattern and its higher hamonic components 2/T, 3/T, . . . and so forth can be observed as shown in FIG. 21. Here, if a narrow band filter or resonance circuit having the frequency 1/T as its center frequency is used, a sync clock can be oscillated at the frequency 1/T. The narrow band filter corresponds to the LPF (low-pass filter) of the PLL circuit. If a filter having a high Q value (tank circuit) at the frequency to be oscillated is used as described above, the clock signal necessary for data recording and reproduction can be obtained. However, though the frequency and phase of the oscillation clock can be synchronized with the pre-pits 210, 211, it is necessary to dispose a pit pattern for phase synchronization which does not exist in the data in order to separate only the pre-pits from the data. For example, auxiliary pits 260, 261 are disposed immediately before or after the pre-pits 210, 211 and the reproduction signal of its differential signal is subjected to pattern recognition so as to distinguish it from the data pit 231 and to separate the pre-pits 210, 211. If a modulation system wherein the upper and lower limits exist to the data pattern length, e.g. 2-7 modulation and aforementioned MFM, is employed in place of NRZ, it is effective to dispose a pattern, which does not exist in the data pattern, in the header area.

The foregoing description uses the sampled servo format as the track format and represents the example of clamping of the level of the magnetization signal 104 corresponding to the sample pit or to the clamp-only area in the case of optomagnetic recording, and the example of clamping of the level of the reproduction signal 102 in the clamp-only area in the case of ablative recording.

Another method clamps the signal level of the unrecording area that exists in the reproduction data signal. Though this method does not need any particular clamp-only area, it must have the DC free characteristics to some extent as the data modulation system. In other words, since the unrecording area is the portion which corresponds to "0" of the modulated code word, "0"s must appear with certain frequency. To apply this method to NRZ modulation, the portion using the code word as "0" must be inserted positively into the data train. In addition, the reproduction clock 114 must be obtained by a system which is different from the data train. This can be accomplished by a method which uses the sampled servo format or a method which inserts positively the change points of "1" and "0" into the data train and accomplishes equivalently the self-clocking ability.

Figure 23:
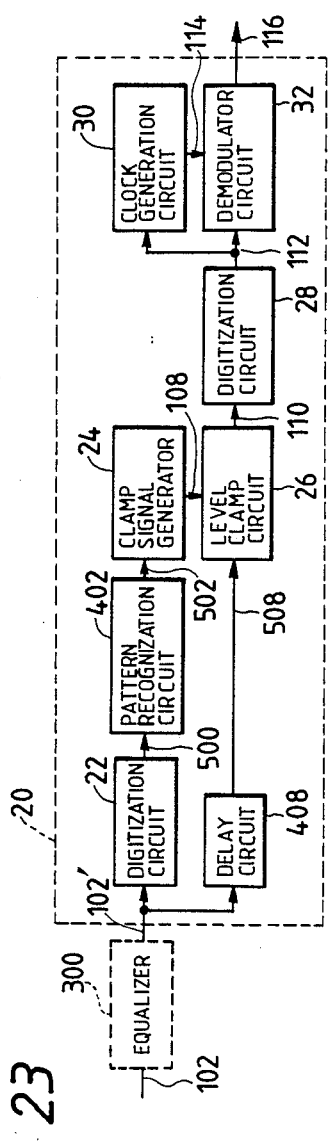
FIG. 23 shows a structural example of reproduction circuit 20 when a reproduction signal level corresponding to an unrecording area in data is clamped.
Figure 24:
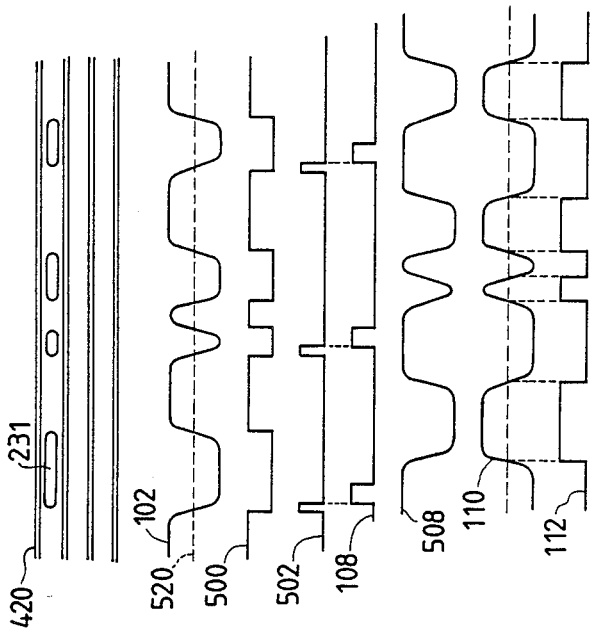
FIG. 24 is a waveform diagram useful for explaining the operation of the circuit shown in FIG. 23.

FIG. 23 shows a structural example of the reproduction circuit 20 which clamps the data signal level corresponding to the unrecording area in the recording data, and FIG. 24 shows its operation. In the example shown in FIG. 24, the recording pit 231 is formed by pit edge recording wherein the cord word bits are made to correspond to the leading and trailing edges in the groove portions (land portions) between track guide grooves (pre-grooves) 420. The width of the pre-groove 420 shown in FIG. 24 is smaller than the track width and the width of the land portion is greater than that of the pre-groove. According to this arrangement, even if the reproduction beam spot deviates somewhat from the data track, fluctuation of the reflected beam level from the portion where pits are not recorded hardly exists. Therefore, stable clamp can be made by use of the level of the unrecording area. In FIG. 23, the digitization circuit 22 may have a simple structure such as the circuit shown in FIG. 15(a), and rough digitization is made by the slice level 520 to form the data pulse 500. The digitization processing by this digitization circuit 22 is to judge the portion where the pits are not recorded. A pattern recognition circuit 402 has the function of outputting a pattern detection pulse 502 when the zone where the data pulse 500 is "High" is long to a certain extent. Since the amplitude of the reproduction signal decreases at the dense data pattern portion, such a processing becomes necessary. More definitely, the detection pulse 502 may be outputted by inputting the recording clocks to the counter to count only the zone where the data pulse 500 is "High", judging the counted value by a comparator and outputting the detection pulse 502 when the counted value is greater than a predetermined value. The clamp pulse 108 is generated by the clamp signal generation circuit 24 by this detection pulse 502. The circuit structure such as shown in FIGS. 8(a) and 8(b) may be used for the clamp signal generation circuit 24. On the other hand, the reproduction data signal representing the change of intensity of the reflected beam is delayed by the time corresponding to the delay time of the pattern recognition circuit 402 by the delay line 408 and converted to the delay data signal 508. The level of the side where the pit of the delay data signal 508 is not recorded is clamped by the clamp pulse 108 by the level clamp circuit 26 to obtain the correction data signal 110. In the drawing, though the polarity of the correction data signal 110 and that of the delay data signal 508 are shown inversed, this can be accomplished by use of the level clamp circuit 26 shown in FIG. 10 and by changing the amplifier 150 to an inversion amplifier. The correction data signal 110 is converted to the data pulse 112 by the digitization circuit 28 shown in FIGS. 15 to 17. The subsequent processing is the same as one shown in FIG. 1 and the demodulated data 116 can be thus obtained.

In the embodiment shown in FIG. 23, too, it is advisable to dispose the equalizer 300 at the stage before the reproduction circuit 20 in the same way as in the embodiment shown in FIG. 1 if a modulation system which retains the data at the edge position of the recording pit 231. The structure such as shown in FIG. 18 may be employed for the equalizer 300.

Figure 25:
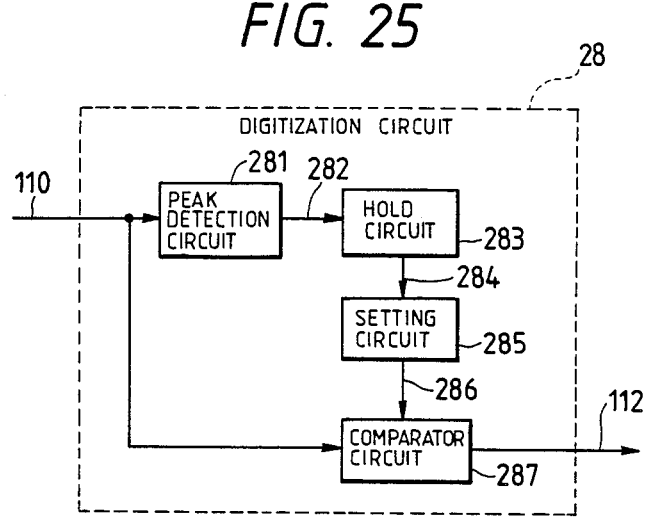
FIG. 25 shows another structural example of the digitization circuit 28.

The structure shown in FIG. 25 may be used for the digitization circuit 28. The peak detection circuit 281 detects the level of the pit portion from the data signal 110. The detected peak value 282 is held by the hold circuit 283 and converted to the reference value 284. The threshold 286 is generated by a setting circuit 285 on the basis of this reference value 284, and a comparator 287 digitizes the data signal 110 by this threshold 286 to obtain the reproduced pulse 112.

In FIG. 25, a heretofore known structure may be used for the peak detection circuit 281 and the hold circuit 283. Next, the setting circuit 285 and the comparator 287 will be explained in detail.

Figure 26:
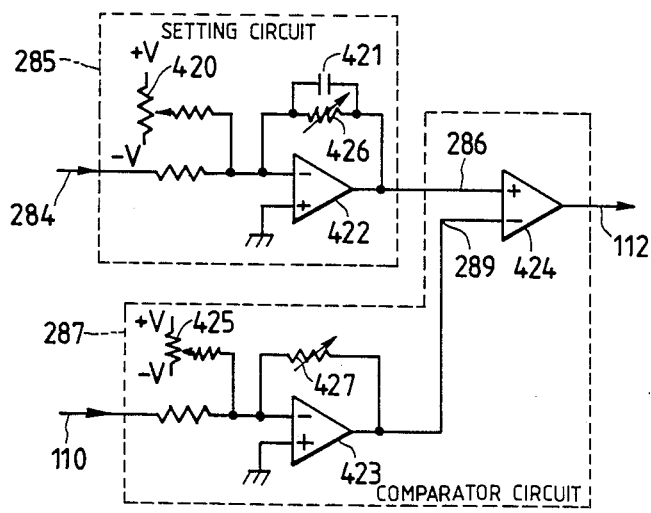
FIG. 26 shows a structural example of a setting circuit and a comparator.
Figure 27A:
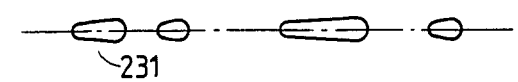
FIGS. 27(a)–27(g) are a waveform diagram showing the operation of the digitization circuit.
Figure 27B:
Figure 27C:
Figure 27D:
Figure 27E:
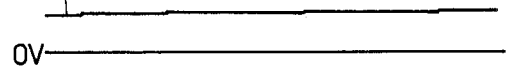
Figure 27F:
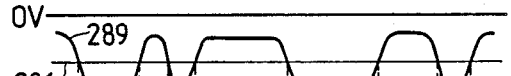
Figure 27G:

FIG. 26 shows a structural example of each of the setting circuit 285 and the comparator 287. In the setting circuit 285 shown in FIG. 26, an approximate threshold value is set beforehand by a variable resistor 420 and the threshold 286 is obtained in accordance with the increase and decrease of the reference value 284. To suppress the fluctuation of the reference value 284, smoothing is made by a capacitor 421. The set value by the variable resistor 420 may be set automatically by an upper order controller. A variable resistor 426 for gain control is provided to the amplifier 422.

On the other hand, the comparator 287 consists of an amplifier 423 for changing the gain and offset value of the data signal 110 and a comparator 424. Variable resistors 425 and 427 are those which are used for offset control and gain control. These values, too, can be set automatically by the upper order controller described above. The comparator 424 compares the reproduction data signal 289 with the threshold 286 to obtain the reproduced pulse 112.

FIG. 27 shows the operation of the digitization circuit 28 shown in FIGS. 25 and 26 in the signal waveform at each circuit portion. If the recording pit 231 has the tear-drop shape, the inclination of the reproduction data signal 102 is different between the front and rear parts of the pit. Equalization is made for the inversion signal 103 by the equalizer 300 to obtain the equalization signal 102' as the waveform improving asymmetry. This equalization signal is subjected to level clamping and converted to the reproduction data signal 110.

The peak detection circuit 281 detects the peak value 282 and the peak value is held to obtain the reference value 284. After offset control and smoothing by the circuit shown in FIG. 4, this reference value 284 becomes the threshold 286. The reproduction pulse 122 can be obtained by digitizing the reproduction data signal 289 by the threshold 286.

Figure 28A:
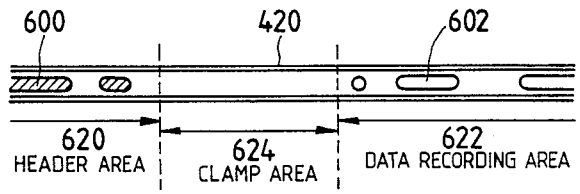
FIGS. 28(a) and 28(b) show set examples of a clamp area (unrecording area) in the case of a continuous group format.
Figure 28B:
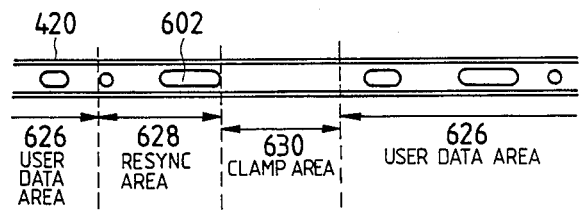

FIGS. 28(a) and 28(b) show set examples of the clamp area (unrecording area) in the case of a continuous group format. In FIG. 28(a), the unrecording area is disposed as the clamp area 624 between the pre-pit area (header area) 620 consisting of the pre-pits 600 formed in advance on the disc and the data area 622 where a user records the data. In the track format of FIG. 28(b), since only one header area 620 exists for each sector, the overhead area where the data cannot be recorded is not much great, but if the fluctuation of the reproduction signal cannot be regarded as being constant inside one sector, the problem may occur that the fluctuation of the correction data signal after clamp processing cannot be suppressed. FIG. 28(b) shows the case where the portions immediately after a plurality of resync areas 628 existing in the data area are used as the clamp area 630. The resync patterns are inserted suitably into the data train in order to resynchronize the PLL system for generating the reproduction clock. Therefore, overhead somewhat increases in the track format shown in FIG. 28(b), but the number of clamp areas 630 becomes greater than that of FIG. 28(a) so that the effect of suppressing the level fluctuation of the reproduction data signal becomes greater. In the track formats shown in FIGS. 28(a) and 28(b), the land areas between the pre-grooves are used as the data recording area but the pre-grooves may be used. However, level fluctuation is less if the pre-groove is used as the reference level for clamp processing. If the structure shown in FIG. 8(b) is used as the clamp signal generation circuit 24, the clamp pulse can be generated in an arbitrary area. Therefore, the clamp pulse 108 is generated in the clamp areas 624 and 630 and the level of the reproduction data signal obtained from this area can be clamped easily.

According to the present invention, the DC component can be stabilized by clamping the level of the reproduction signal in the unrecording area. If a modulation recording system which uses the sampled servo format or which inserts positively the unrecording area into the data train is employed, data recognition can be made stably even for a modulation system which, through not having the DC free characteristics and self-clocking ability, has a wide detection window width such as NRZ modulation. If the detection window width is great, a margin can be secured for jitter fluctuation due to noise so that reliability of data recognition can be improved. In the case of ordinary modulation systems, too, it is possible to suppress the fluctuation of the DC component and to obtain the similar effect by disposing a zone where the data is not recorded, such as an area where "0" of the cord word continues to some extents or a specific unrecording area, and using this area as the clamp area. Since regeneration of the DC component can be made in an AC-coupled amplification system, too, by clamp processing, it is possible to reduce adverse influences of the drift of the circuit system and to suppress the fluctuation of the signal level due to the change of reflection factor of the recording medium and retardation.

Since the inclination at the leading and trailing edges of the reproduced waveform that arises from asymmetry of the pit shape is made uniform by the equalizer, correspondence of the edge position of the recording pit to the edge position of the reproduced pulse can be improved. Furthermore, since the reproduction pulse is obtained by using the level at the pit portion, where the level of the reproduction signal is relatively stable, as the reference of the threshold and making digitization by use of the same, signal detection error can be reduced and signal reproduction can be made highly reliably.

What is claimed is:

1. A method of reproducing data encoded on a track which has first and second recording areas therealong, said encoded data being recorded only on said second recording area by a data recording means, said method comprising:
   detecting reflected light as a laser spot scans along said track and producing an output signal indicative thereof;
   detecting reflected light as a laser spot scans along said track and producing an output signal indicative thereof;
   extracting a read data signal from said output signal;
   clamping said read data signal at a reference level when said laser spot scans on said first recording area to produce a corrected data signal; and
   processing said corrected data signal in accordance with a threshold level and obtaining a data pulse indicative of said 2. The method as set forth in claim 1, wherein said track has pre-pits which are formed at predetermined intervals, and wherein said clamping step is controlled by a clamp pulse signal which is derived from a pit pulse signal corresponding to said pre-pits which indicates when said laser spot scans on said first recording area.

3. The method as set forth in claim 2, wherein said extracting step includes a step of obtaining as said read data a signal indicative of variations in polarization of said reflected light and a step of obtaining a signal indicative of variations in intensity of said reflected light as a read pit signal corresponding to said pre-pits.

4. The method as set forth in claim 2, wherein said extracting step includes a step of obtaining as said read data signal a differential signal between respective outputs of a plurality of photodetectors which receive P and S polarization components of said reflected light and a step of obtaining a sum signal between said respective outputs of the photodetectors as a read pit signal corresponding to said pre-pits.

5. The method as set forth in claim 2, wherein said extracting step includes a step of obtaining as said read data signal a sum signal between respective outputs of a split-photodetector which receives said reflected light and a step of obtaining as a read pit signal a differential signal between said outputs of the split-photodetector corresponding to said pre-pits.

6. The method as set forth in claim 2, wherein said first recording area has at least one of said pre-pits, and wherein said extracting step includes a step of obtaining as said read signal a signal indicative of variations in polarization of said reflected light and obtaining a signal relative to variations in intensity of said reflected light as a read pit signal corresponding to said pre-pits.

7. The method as set forth in claim 2, wherein said pre-pits are formed on areas other than said first and second recording areas.

8. The method as set forth in claim 7, wherein said extracting step includes a step of obtaining as said read signal a signal relative to variations in polarization of said reflected light and a step of obtaining a signal indicative of variations in intensity of said reflected light as a read pit signal corresponding said pre-pits.

9. The method as set forth in claim 1, further including a step of equalizing said read data signal so that an inclination of rise of said read data signal is the same as an inclination of fall of said read data signal.

10. The method as set forth in claim 9, wherein said equalizing step includes a step of changing equalization characteristics in accordance with at least one of a recording position of said encoded data and a linear velocity of said read data signal.

11. The method as set forth in claim 1, wherein said processing step includes a step of setting said threshold level in accordance with a level of said read data signal obtained by sampling when said laser spot scans on said first recording area.

12. The method as set forth in claim 1, wherein said processing step includes a step of setting said threshold level in accordance with said reference level.

13. The method as set forth in claim 1, wherein said processing step includes a step of setting said threshold level in accordance with a level of said corrected data signal obtained by peak detection when said laser spot scans on said second recording area.

14. An apparatus for reproducing data encoded on a track which has first and second recording areas therealong, said encoded data being recorded only on said second area by a data recording means, said apparatus comprising:
   detecting means for detecting reflected light as a laser spot scans along said track and producing an output signal indicative thereof;
   extracting means for extracting a read data signal from said output signal;
   clamping means for clamping a level of said read data signal at a reference level when said laser spot scans on said first recording area to produce a corrected data signal; and
   processing means for processing said corrected data signal in accordance with a threshold level and obtaining a data pulse indicative of said encoded data.

15. The apparatus as set forth in claim 14, wherein said detecting means includes:
   optical means for scanning said track with said laser spot; and
   photodetector means for detecting said reflected light.

16. The apparatus as set forth in claim 15, wherein said track has pre-pits which are formed at predetermined intervals.

17. The apparatus as set forth in claim 16, further comprising clamp signal generator means for generating a clamp pulse signal for controlling said clamping means, wherein said clamp pulse signal indicates when said laser spot scans on said first recording area, said clamp pulse signal being derived from a pit pulse signal corresponding to said pre-pits.

18. The apparatus as set forth in claim 17, wherein said extracting means includes:
   means for obtaining as said read data signal a signal indicative of variations in polarization of said reflected light; and
   means for obtaining a read pit signal indicative of variations in intensity of said reflected light corresponding to said pre-pits.

19. The apparatus as set forth in claim 17, wherein said extracting means includes:
   means for obtaining as said read data signal a differential signal between respective outputs of said photodetector means which receive P and S polarization components of said reflected light; and
   means for obtaining a sum signal between said respective outputs of said photodetector means as a read pit signal corresponding to said pre-pits.

20. The apparatus as set forth in claim 17, wherein said photodetector means includes a split type photodetector which receives said reflected light, wherein said extracting means includes means for obtaining as said read data signal a sum signal between respective outputs of said split type photodetector and means for obtaining a differential signal between said respective outputs of said split type photodetector as a read pit signal corresponding to said pre-pits.

21. The apparatus as set forth in claim 17, wherein said first recording area has at least one of said pre-pits, and wherein said extracting means includes means for obtaining as said read data signal a signal indicative of variations in polarization of said reflected light and means for obtaining a signal indicative of variations in intensity of said reflected light as a read pit signal corresponding to said pre-pits.

22. The apparatus as set forth in claim 17, wherein said pre-pits are formed on areas other than said first and second recording areas.

23. The apparatus as set forth in claim 22, wherein said extracting means includes means for obtaining as said read data signal a signal indicative of variations in polarization of said reflected light and means for obtaining a signal indicative of variations in intensity of said reflected light as a read pit signal corresponding to said pre-pits.

24. The apparatus as set forth in claim 14, further including equalizing means for equalizing said read data signal so that an inclination of rise of said read data signal is equal to an inclination of fall of said read data signal.

25. The apparatus as set forth in claim 24, wherein said equalizing means changes equalization characteristics in accordance with at least one of a recording position of said encoded data and a linear velocity of said read data signal.

26. The apparatus as set forth in claim 14, wherein said process means includes threshold means for setting said threshold level in accordance with a level of said read data signal obtained by sampling when said laser spot scans on said first recording area.

27. The apparatus as set forth in claim 14, wherein said processing means includes threshold means for setting said threshold level in accordance with said reference level.

28. The apparatus as set forth in claim 14, wherein said processing means includes threshold means for setting said threshold level in accordance with a level of said corrected data signal obtained by peak detection when said laser spot scans on said second area.

29. A method of reproducing data encoded on a track which has a clamp area and a recording area therealong, said encoded data being recorded on said recording area by a data recording means, and said encoded data are not recorded on said clamp area, said method comprising:
    detecting reflected light as a laser spot scans along said track and producing an output signal indicative thereof;
    extracting a read data signal from said output signal indicative of said reflected light;
    holding a level of said read data signal at a reference level when said laser spot scans on said clamp area to produce a corrected data signal; and
    digitizing said corrected data signal in accordance with a threshold level and obtaining a data pulse indicative of said encoded data.

30. The method as set forth in claim 29, wherein said track has pre-pits which are formed at predetermined intervals, and wherein said holding step is controlled by a clamp pulse signal which is derived from a pit pulse signal corresponding to said pre-pits and which indicates when said laser spot scans on said clamp area.

31. The method as set forth in claim 30, wherein said pre-pits are formed as phase pits at a depth substantially equal to $\frac{1}{4}$ of the wavelength of said laser spot, and wherein said encoded data is recorded as magnetic domains having a different direction of magnetization from that of said track.

32. The method as st forth in claim 31, wherein said extracting step includes a step of obtaining as said read data signal a signal indicative of variations in polarization of said reflected light and a step of obtaining a signal indicative of variations in intensity of said reflected light as a read pit signal corresponding to said pre-pits.

33. The method as set forth in claim 31, wherein said extracting step includes a step of obtaining as said read data signal a differential signal between respective outputs of a plurality of photodetectors which receive P and S polarization components of said reflected light and obtaining a sum signal between said respective outputs of said plurality photodetectors as a read pit signal corresponding to said pre-pits.

34. The method as set forth in claim 30, wherein said pre-pits are formed as phase pits at a depth substantially equal to $\frac{1}{2}$ of the wavelength of said laser spot, and wherein said encoded data is recorded as density pits formed by ablative recording.

35. The method as set forth in claim 34, wherein said extracting step includes a step of obtaining as said read data signal a sum signal between respective outputs of a split-photodetector which receives said reflected light and a step of obtaining a differential signal between said respective outputs of the split -photodetector as a read pit signal corresponding to said pre-pits.

36. The method as set forth in claim 31, wherein said clamp area has at least one of said pre-pits.

37. The method as set forth in claim 31, wherein said pre-pits are formed on areas other than said clamp and recording areas.

38. The method as set forth in claim 34, wherein said clamp area has at least one of said pre-pits.

39. The method as set forth in claim 34, wherein said pre-pits are formed on areas other than said clamp and recording areas.

40. The method as set forth in claim 30, wherein said extracting step includes a step of obtaining as said read data signal a signal indicative of variations in polarization of said reflected light and a step of obtaining a signal indicative of variations in intensity of said reflected light as a read pit signal corresponding to said pre-pits.

41. The method as set forth in claim 29, further including a step of equalizing said read data signal in order to improve waveform asymmetry of said read data signal.

42. The method as set forth in claim 41, wherein said equalizing step includes a step of changing equalization characteristics in accordance with at least one of a recording position of said encoded data and a linear velocity of said read data signal.

43. The method as set forth in claim 29, wherein said digitizing step includes a step of setting said threshold level in accordance with a level of said read data signal obtained by sampling when said laser spot scans on said clamp area.

44. The method as set forth in claim 29, wherein said digitizing step includes a step of setting said threshold level in accordance with said reference level.

45. The method as set forth in claim 29, wherein said digitizing step includes a step of setting said threshold level in accordance with a level of said corrected data signal obtained by peak detection when said laser spot scans on said recording area.

46. A method of reproducing data encoded on a track which has a servo area and a recording area therealong, wherein said encoded data is recorded by data recording means only on said recording area, and at least one pre-pit is formed on said servo area, said method comprising:

detecting reflected light as a laser spot scans along said track and producing an output signal indicative thereof;

extracting a read data signal from said output signal;

deriving a clamp pulse signal from a pit pulse signal corresponding to said pre-pit, said clamp pulse signal indicating when said laser spot scans on said servo area;

clamping said read data signal to a reference level in accordance with said clamp pulse signal to produce a corrected data signal; and digitizing said corrected data signal in accordance with a threshold level and obtaining a data pulse indicative of said encoded data.

47. The method as set forth in claim 46, wherein said pre-pit is formed as a phase pit at a depth substantially equal to ½ of the wavelength of said laser spot, and wherein said encoded data are recorded as magnetic domains having a different direction of magnetization from that of said track.

48. The method as set forth in claim 47, wherein said extracting step includes a step of obtaining as said read data signal a signal indicative of variations in polarization of said reflected light and a step of obtaining a signal indicative of variations in intensity of said reflected light as a read pit signal corresponding to said pre-pit.

49. The method as set forth in claim 46, wherein said pre-pit is formed as a phase pits at a depth substantially equal to ½ of the wavelength of said laser spot, and wherein said encoded data is recorded as density pits formed by ablative recording.

50. The method as set forth in claim 49, wherein said extracting step includes a step of obtaining as said read data signal a sum signal between respective outputs of a split-photodetector which receives said reflected light and a step of obtaining a differential signal between said respective outputs of the split-photodetector as a read pit signal to said pre-pit.

51. The method as set forth in claim 46, further including a step of equalizing said read data signal in order to improve waveform asymmetry of said read data signal.

52. The method as set forth in claim 51, wherein said equalizing step includes a step of changing equalization characteristics in accordance with at least one of a recording position of said encoded data and a linear velocity of said read data signal.

53. A method of reproducing data encoded on a track which has a servo area, a clamp area and a recording area therealong, wherein said encoded data is recorded by data recording means only on said recording area, and at least one pre-pit is formed on said servo area, said method comprising:

detecting reflected light as a laser spot scans along said track and producing an output signal indicative thereof;

extracting a read data signal from said output signal;

deriving a clamp pulse signal from a pit pulse signal corresponding to said pre-pit, said clamp pulse signal indicating when said laser spot scans on said clamp area;

clamping said read data signal to a reference level in accordance with said clamp pulse signal to produce a corrected data signal; and digitizing said corrected data signal in accordance with a threshold level and obtaining a data pulse indicative of said encoded data.

54. The method as set forth in claim 53, wherein said pre-pit is formed as a phase pit at a depth substantially equal to ½ of the wavelength of said laser spot, and wherein said encoded data is recorded as magnetic domains having a different direction of magnetization from said track.

55. The method as set forth in claim 54, wherein said extracting step includes a step of obtaining as said read data signal a signal indicative of variations in polarization of said reflected light and a step of obtaining a signal indicative of variations in intensity of said reflected light as a read pit signal corresponding said pre-pit.

56. The method as set forth in claim 55, wherein said pre-pit is formed as a phase pit at a depth substantially equal to ½ of the wavelength of said laser spot, and wherein said encoded data is recorded as density pits formed by ablative recording.

57. The method as set forth in claim 56, wherein said extracting step includes a step of obtaining as said read data signal a sum signal between respective outputs of a split-photodetector which receives said reflected light and a differential signal between said respective outputs of the split-photodetector as a read pit signal corresponding to said pre-pit.

58. The method as set forth in claim 53, further including a step of equalizing said read data signal in order to improve waveform asymmetry of said read data signal.

59. The method as set forth in claim 58, wherein said equalizing step further includes a step of changing equalization characteristics in accordance with at least one of a recording position of said encoded data and a linear velocity of said read data signal.

60. An apparatus for reproducing data encoded on a track which has first and second recording areas therealong, wherein said encoded data is recorded only on said second area by data recording means, said apparatus comprising:

an optical head for detecting reflected light as a laser spot scans along said track and producing an output signal indicative thereof;

a circuit for obtaining a read data signal from said output signal;

a level clamp circuit for clamping a level of said read data signal to a reference level when said laser spot scans on said first recording area to produce a corrected data signal; and a digitization circuit for processing said corrected data signal in accordance with a threshold level and obtaining a data pulse indicative of said encoded data.

61. The apparatus as set forth in claim 60, wherein said optical head includes:

optical means for scanning said track with said laser spot; and photodetector means for receiving said reflected light.

62. The apparatus as set forth in claim 61, wherein said track has pre-pits which are formed at predetermined intervals.

63. The apparatus as set forth in claim 62, further comprising a clamp signal generator for generating a clamp pulse signal for controlling said level clamp circuit, wherein said clamp pulse signal indicates when said laser spot scans on said first recording area, said clamp pulse signal being derived from a pit pulse signal corresponding to said pre-pits.

64. The apparatus as set forth in claim 63, wherein said circuit includes:
a first amplifier for obtaining as said read data signal a signal indicative of variations in polarization of said reflected light; and
a second amplifier for obtaining a signal indicative of variations in intensity of said reflected light as a read pit signal corresponding to said pre-pits.

65. The apparatus as set forth in claim 63, wherein said circuit includes:
a first amplifier for obtaining as said read data signal a differential signal between respective outputs of said photodetector means which receives P and S polarization components of said reflected light; and
a second amplifier for obtaining a sum signal between said respective outputs of said photodetector means as a read pit signal relative to said pre-pits.

66. The apparatus as set forth in claim 63, wherein said first recording area is a servo area having at least one of said pre-pits, and wherein said circuit includes a first amplifier for obtaining as said read data signal a signal indicative of variations in polarization of said reflected light and a second amplifier for obtaining a signal indicative of variations in intensity of said reflected light as a read pit signal corresponding to said pre-pits.

67. The apparatus as set forth in claim 63, wherein said pre-pits are formed on areas other than said first and second recording areas, and wherein said encoded data is not recorded on said other areas.

68. The apparatus as set forth in claim 67, wherein said circuit includes a first amplifier for obtaining as said read data signal a signal indicative of variations in polarization of said reflected light and a second amplifier for obtaining a signal indicative of variations in intensity of said reflected light as a read pit signal corresponding to said pre-pits.

69. The apparatus as set forth in claim 60, further including an equalizer for equalizing said read data signal so that an inclination of rise of said read data signal is the same as an inclination of fall of said read data signal.

70. The apparatus as set forth in claim 69, wherein said equalizer changes equalization characteristics in accordance with at least one of a recording position of said encoded data and a linear velocity of said read data signal.

71. The apparatus as set forth in claim 60, wherein said digitization circuit includes a level shifter for setting said threshold level in accordance with a level of said read data signal obtained by sampling when said laser spot scans on said first recording area.

72. The apparatus as set forth in claim 60, wherein said digitization circuit includes a level shifter for setting said threshold level in accordance with said reference level.

73. The apparatus as set forth in claim 64, wherein said digitization circuit includes a level setting circuit for setting said threshold level in accordance with a level of said corrected data signal obtained by peak detection when said laser spot scans on said second recording area.

* * * * *